US011081974B2

(12) United States Patent
Hario et al.

(10) Patent No.: US 11,081,974 B2
(45) Date of Patent: Aug. 3, 2021

(54) FAULT TOLERANT MULTILEVEL MODULAR POWER CONVERSION DEVICE

(71) Applicant: Mitsubishi Electric Corporation, Tokyo (JP)

(72) Inventors: Masahiro Hario, Tokyo (JP); Noriyuki Imada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/639,619

(22) PCT Filed: Oct. 4, 2017

(86) PCT No.: PCT/JP2017/036125
§ 371 (c)(1),
(2) Date: Feb. 17, 2020

(87) PCT Pub. No.: WO2019/069394
PCT Pub. Date: Apr. 11, 2019

(65) Prior Publication Data
US 2021/0135597 A1 May 6, 2021

(51) Int. Cl.
*H02M 7/483* (2007.01)
*H02M 7/5395* (2006.01)
(Continued)

(52) U.S. Cl.
CPC ........... *H02M 7/5395* (2013.01); *H02M 1/08* (2013.01); *H02M 1/32* (2013.01); *H02M 7/483* (2013.01);
(Continued)

(58) Field of Classification Search
CPC ...... H02M 7/5395; H02M 7/483; H02M 1/08; H02M 1/32; H02M 2001/0012; H02M 2001/325; H02M 2007/4835
See application file for complete search history.

(56) References Cited

U.S. PATENT DOCUMENTS 9,438,098 B2    9/2016  Kim et al.
10,734,914 B2*  8/2020  Azidehak .............. H02M 7/483
2012/0113698 A1  5/2012  Inoue et al.

FOREIGN PATENT DOCUMENTS

CN    102201670 A  *  9/2011
CN    103636126 A  *  3/2014  .............. H02M 1/08
(Continued)

OTHER PUBLICATIONS

International Search Report (PCT/ISA/210) dated Nov. 21, 2017, by the Japan Patent Office as the International Searching Authority for International Application No. PCT/JP2017/036125.

Primary Examiner — Kyle J Moody
Assistant Examiner — Jye-June Lee
(74) Attorney, Agent, or Firm — Buchanan Ingersoll & Rooney PC

(57) ABSTRACT

A power conversion device includes: first and second control devices that generate first and second control commands respectively; and first and second relay devices that transmit, to each sub module, the first and second control commands respectively. The first and second control devices receive instruction information indicating a system that is to control operation of each sub module. The first and second control commands each include a drive command, abnormality determination information about the control device, and instruction information. Even when the instruction information indicates a first system, each sub module selects a second system as a system to control operation of each sub module in response to detection of occurrence of abnormality to the first control device, and performs PWM control for a switching element in accordance with the drive command included in the second control command for the second system.

20 Claims, 12 Drawing Sheets

(51) Int. Cl.
*H02M 1/08* (2006.01)
*H02M 1/32* (2007.01)
*H02M 1/00* (2006.01)

(52) U.S. Cl.
CPC .............. *H02M 2001/0012* (2013.01); *H02M 2001/325* (2013.01); *H02M 2007/4835* (2013.01)

(56) References Cited

FOREIGN PATENT DOCUMENTS

| | | | | |
|---|---|---|---|---|
| EP | 2905889 | A1 | 8/2015 | |
| JP | 2011024393 | A | 2/2011 | |
| JP | 2015130746 | A | 7/2015 | |
| WO | WO-2017055605 | A1 * | 4/2017 | ............ H02M 7/483 |

* cited by examiner

FAULT TOLERANT MULTILEVEL MODULAR POWER CONVERSION DEVICE

TECHNICAL FIELD

The present disclosure relates to a power conversion device performing power conversion between AC and DC.

BACKGROUND ART

The Modular Multilevel Converter (MMC) is known as a self-excited power conversion device used in a DC power transmission system. The Modular Multilevel Converter includes, for each phase of AC, an upper arm connected to a high-potential-side DC terminal and a lower arm connected to a low-potential-side DC terminal. Each arm is made up of a plurality of cascaded sub modules (unit converters).

For example, Japanese Patent Laying-Open No. 2015-130746 (PTL 1) discloses a power conversion device including a power conversion circuit capable of converting AC to DC or DC to AC. The power conversion circuit includes an arm made up of a plurality of series-connected unit converters. The power conversion device further includes a first control device collectively controlling each of the unit converters, a plurality of second control devices daisy-chained to the first control device, and a third control device connected to the second control device for controlling a corresponding unit converter.

CITATION LIST

Patent Literature

PTL 1: Japanese Patent Laying-Open No. 2015-130746

SUMMARY OF INVENTION

Technical Problem

In a power conversion device required to have high reliability, its internal configuration is partially or entirely a multiplex configuration in many cases. By way of example, a control device controlling each sub module may have a multiplex (duplex, for example) configuration. In a self-excited converter, a semiconductor device provided for each sub module is switched on or off instantaneously by a gate pulse. Therefore, if system switchover between a control device of an active system and a control device of a standby system is not made appropriately, an AC system and a DC system that are connected to the power conversion device are affected significantly. While PTL 1 considers reduction of a communication transmission delay of a power conversion device to improve the control response, PTL 1 does not teach or suggest at all a configuration for appropriately making system switchover.

An object according to an aspect to the present disclosure is to provide a power conversion device capable of making switchover from an active system to a standby system without stopping sub modules upon occurrence of abnormality to a control device of the active system, by giving the sub modules a function of selecting either the active system or the standby system.

Solution to Problem

In accordance with an embodiment, a power conversion device that performs power conversion between a DC circuit and an AC circuit is provided. The power conversion device includes: power conversion circuitry including a plurality of sub modules connected in series to each other; a first control device and a second control device to generate a first control command and a second control command respectively for controlling operation of each of the sub modules; and a first relay device and a second relay device to transmit the first control command and the second control command respectively to each of the sub modules. The first control device and the second control device receive, from a predetermined external device, instruction information indicating either a first system or a second system, as a system that controls operation of each of the sub modules, wherein the first system includes the first control device and the first relay device, and the second system includes the second control device and the second relay device. Each of the first control command and the second control command includes: a drive command for driving a switching element included in each of the sub modules; abnormality determination information indicating whether abnormality is present in a control device; and the instruction information. Each of the sub modules includes: a PWM controller to perform PWM control for the switching element; and a selector to select either the first system or the second system, based on the abnormality determination information and the instruction information that are included in each of the first control command and the second control command. The selector selects the second system as a system to control operation of each of the sub modules, in response to occurrence of abnormality to the first control device that is detected based on the abnormality determination information of the first control command, even when the instruction information indicates the first system. The PWM controller performs PWM control for the switching element in accordance with the drive command included in the second control command for the selected second system.

Advantageous Effects of Invention

According to the present disclosure, switchover between the active system and the standby system can be made without stopping sub modules, upon occurrence of abnormality to the control device of the active system.

DESCRIPTION OF EMBODIMENTS

Figure 1:
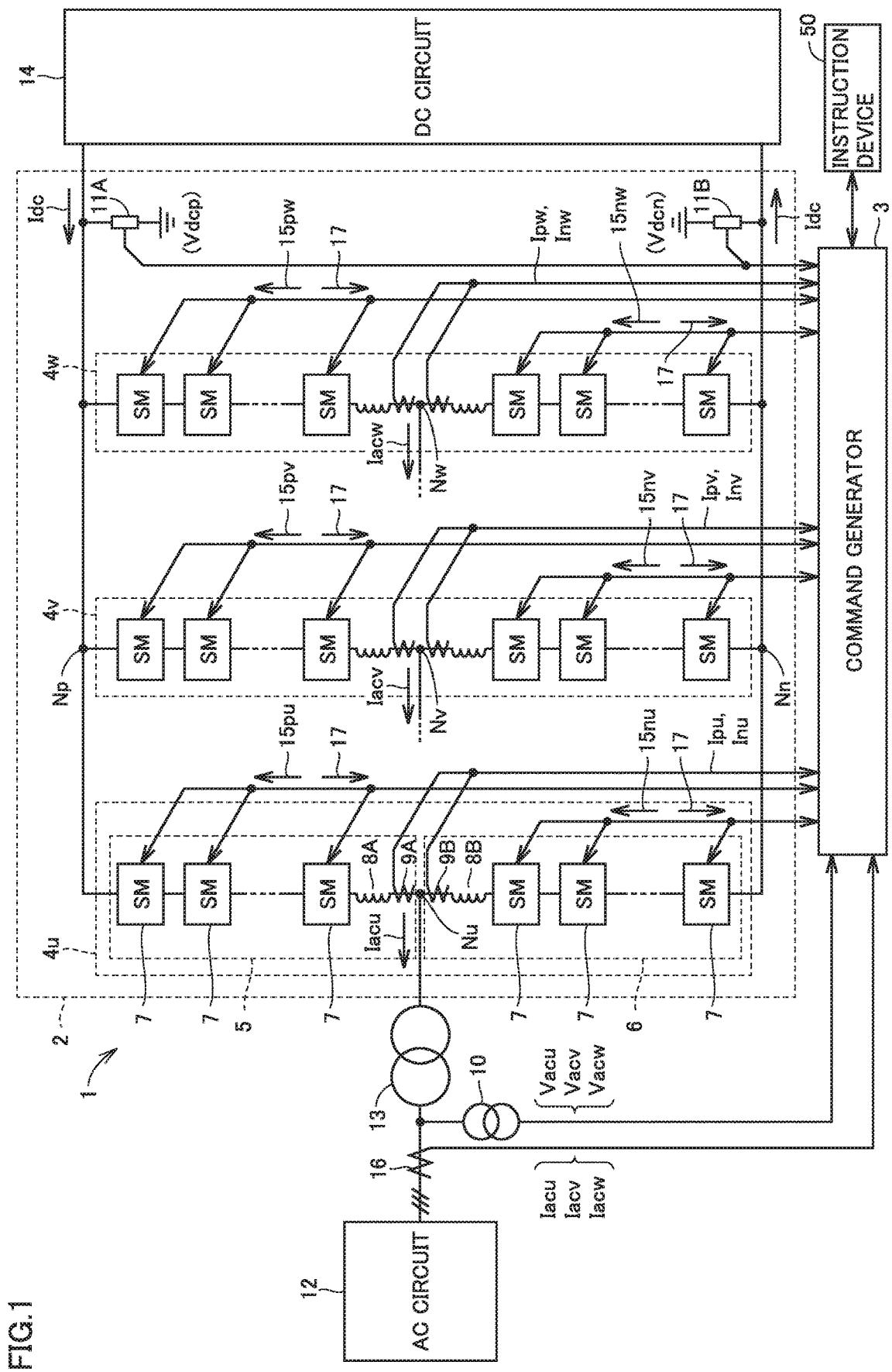
FIG. 1 is a schematic configuration diagram of a power conversion device according to Embodiment 1.

Embodiments of the present invention are described hereinafter with reference to the drawings. In the following description, the same parts are denoted by the same reference characters. They are named identically and function identically. A detailed description of them is therefore not repeated.

Embodiment 1

[Configuration of Power Conversion Device]

FIG. 1 is a schematic configuration diagram of a power conversion device according to Embodiment 1. Referring to FIG. 1, power conversion device 1 is configured in the form of a modular multilevel converter including a plurality of sub modules (corresponding to "SM" in FIG. 1) connected in series to each other. "Sub module" is also called "converter cell" or "unit converter." Power conversion device 1 performs power conversion between a DC circuit 14 and an AC circuit 12. Specifically, power conversion device 1 includes power conversion circuitry 2 and a command generator 3. In a power conversion system including power conversion device 1, an instruction device 50 is provided that is an external device giving various instructions to power conversion device 1.

Power conversion circuitry 2 includes a plurality of leg circuits 4u, 4v, 4w (referred to as leg circuit 4 where the leg circuits are mentioned collectively or any of the leg circuits is mentioned) that are connected in parallel with each other between a positive DC terminal (i.e., high-potential-side DC terminal) Np and a negative DC terminal (i.e., low-potential-side DC terminal) Nn.

Leg circuit 4 is provided for each of a plurality of phases of AC. Leg circuit 4 is connected between AC circuit 12 and DC circuit 14 for performing power conversion between the AC circuit and the DC circuit. FIG. 1 shows AC circuit 12 of a three-phase AC system, and three leg circuits 4u, 4v, and 4w are arranged respectively for U phase, V phase, and W phase.

AC input terminals Nu, Nv, and Nw arranged respectively in leg circuits 4u, 4v, and 4w are connected to AC circuit 12 through an interconnection transformer 13. AC circuit 12 is an AC power system including an AC power source, for example. For the sake of simplifying illustration, connection between AC input terminals Nv, Nw and interconnection transformer 13 is not shown in FIG. 1.

High-potential-side DC terminal Np and low-potential-side DC terminal Nn connected commonly to leg circuits 4 are connected to DC circuit 14. DC circuit 14 is a DC terminal for a DC power system including a DC transmission network or the like, or a DC terminal for another power conversion device, for example. In the latter case, the two power conversion devices are coupled together to form a BTB (Back To Back) system for connecting AC power systems that are different from each other in the rated frequency, for example.

The leg circuits may be connected to AC circuit 12 through an interconnection reactor instead of interconnection transformer 13 in FIG. 1. Further, instead of AC input terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, leg circuit 4 is connected electrically (DC or AC connection) to AC circuit 12 through respective connecting parts arranged in leg circuits 4u, 4v, 4w, such as AC input terminals Nu, Nv, Vw or the aforementioned primary windings.

Leg circuit 4u includes an upper arm 5 from high-potential-side DC terminal Np to AC input terminal Nu, and a lower arm 6 from low-potential-side DC terminal Nn to AC input terminal Nu. AC input terminal Nu which is a connecting point between upper arm 5 and lower arm 6 is connected to interconnection transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded sub modules 7 and reactor 8A. These sub modules 7 and reactor 8A are connected in series to each other.

Likewise, lower arm 6 includes a plurality of cascaded sub modules 7 and reactor 8B. These sub modules 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power converter is decreased. It is therefore preferable to stop (turn off) all switching devices in each sub module 7 as quickly as possible in the event of a fault.

Power conversion device 1 further includes, as detectors for measuring the amount of electricity (current, voltage, for example) to be used for control, an AC voltage detector 10, an AC current detector 16, DC voltage detectors 11A, 11B, and arm current detectors 9A, 9B disposed in each leg circuit 4.

Signals detected by these detectors are input to command generator 3. Based on these detected signals, command generator 3 outputs control commands 15pu, 15nu, 15pv, 15nv, 15pw, 15nw for controlling the operating states of respective sub modules 7. Command generator 3 also receives, from each sub module 7, a signal 17 representing a detected value of the cell capacitor voltage (the voltage of DC capacitor 24 in FIG. 5).

In the case of the present embodiment, control commands 15pu, 15nu, 15pv, 15nv, 15pw, and 15nw are generated for the U phase upper arm, the U phase lower arm, the V phase upper arm, the V phase lower arm, the W phase upper arm, and the W phase lower arm, respectively. In the following description, where control commands 15pu, 15nu, 15pv, 15nv, 15pw, 15nw are mentioned collectively or any of the control commands is mentioned, they are referred to as control command 15.

For the sake of simplifying the illustration, FIG. 1 shows collectively some of signal lines for signals that are input from respective detectors to command generator 3 and signal lines for signals that are input or output between command generator 3 and respective sub modules 7. Actually, however, the signal line is disposed individually for each detector and each sub module 7. The signal line between each sub module 7 and command generator 3 may be provided as separate transmission line and reception line. In the case of the present embodiment, these signals are transmitted through optical fibers for the sake of noise immunity.

In the following, each detector is described specifically. AC voltage detector 10 detects U phase AC voltage value Vacu, V phase AC voltage value Vacv, and W phase AC voltage value Vacw of AC circuit 12. AC current detector 16 detects U phase AC current value Iacu, V phase AC current value Iacv, and W phase AC current value Iacw of AC circuit 12. DC voltage detector 11A detects DC voltage value Vdcp of high-potential-side DC terminal Np connected to DC circuit 14. DC voltage detector 11B detects DC voltage value Vdcn of low-potential-side DC terminal Nn connected to DC circuit 14.

Arm current detectors 9A, 9B disposed in U phase leg circuit 4u detect upper arm current Ipu flowing in upper arm 5 and lower arm current Inu flowing in lower arm 6, respectively. Likewise, arm current detectors 9A, 9B disposed in V phase leg circuit 4v detect upper arm current Ipv and lower arm current Inv, respectively. Arm current detectors 9A, 9B disposed in W phase leg circuit 4w detect upper arm current Ipw and lower arm current Inw, respectively.

Instruction device 50 is a higher-order device for control devices 30A and 30B, for example, and configured to communicate with command generator 3. In accordance with information from command generator 3 and instructions from a system manager, instruction device 50 gives various instructions to command generator 3.

[Configuration of Command Generator]

Figure 2:
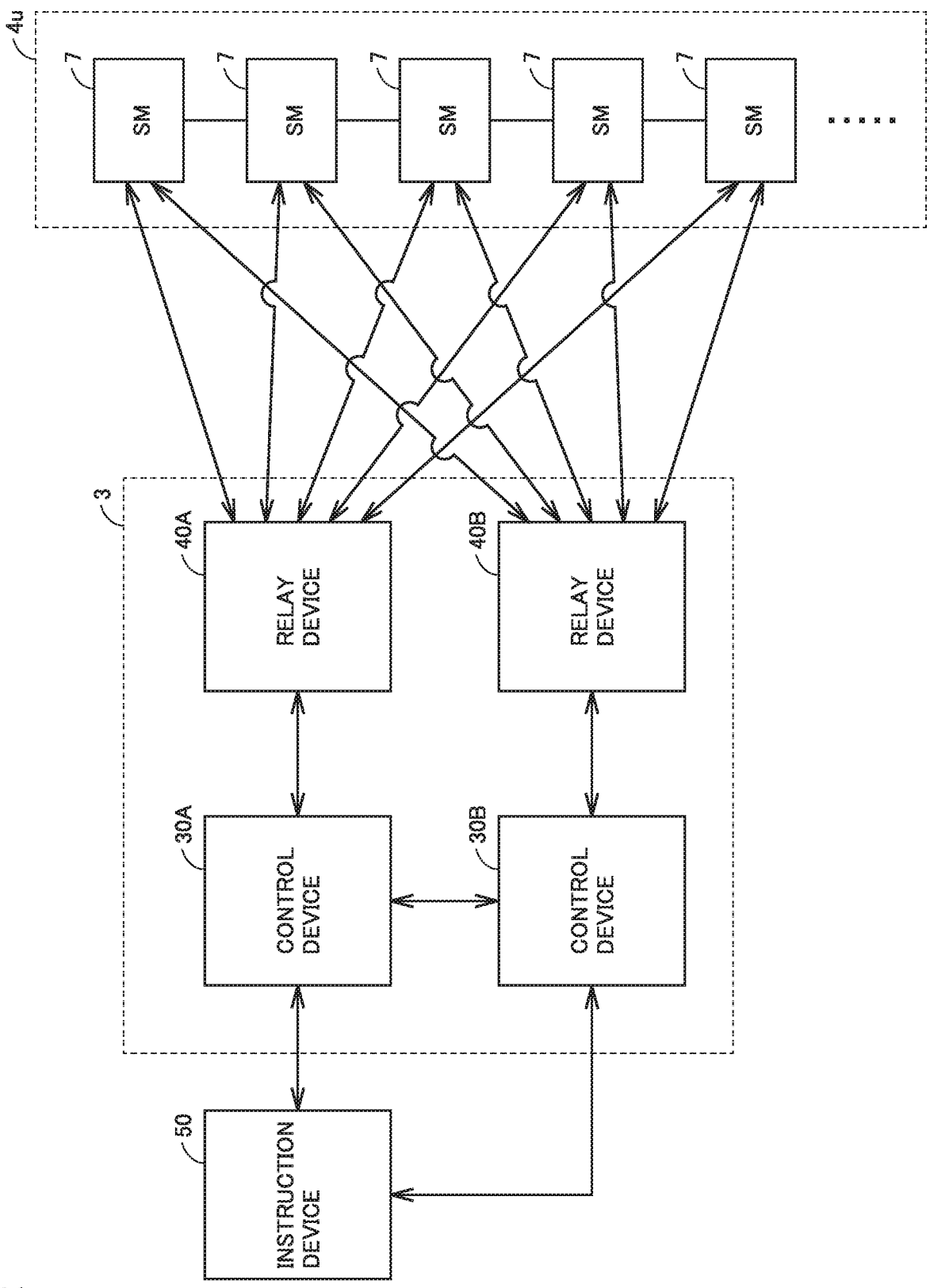
FIG. 2 is a block diagram showing a specific configuration of a command generator according to Embodiment 1.

FIG. 2 is a block diagram showing a specific configuration of the command generator according to Embodiment 1. Referring to FIG. 2, command generator 3 includes control devices 30A, 30B and relay devices 40A, 40B. Thus, for command generator 3, a duplex configuration is employed in which an A system including control device 30A and relay device 40A and a B system including control device 30B and relay device 40B are combined. Control device 30A is configured to communicate with control device 30B, relay device 40A and instruction device 50. Control device 30B is configured to communicate with control device 30A, relay device 40B, and instruction device 50.

While FIG. 2 shows only U phase leg circuit 4u in power conversion circuitry 2 in FIG. 1 as a representative leg circuit, other leg circuits 4v, 4w are similar to leg circuit 4u. Where control devices 30A, 30B are mentioned collectively or any of the control devices is mentioned, they are referred to as control device 30. Where relay devices 40A, 40B are mentioned collectively or any of the relay devices is mentioned, they are referred to as relay device 40.

Control device 30 receives input of AC voltage values Vacu, Vacv, Vacw (referred to as AC voltage value Vac where they are mentioned collectively), AC current values Iacu, Iacv, Iacw (referred to as AC current value Iac where they are mentioned collectively), DC voltage values Vdcp, Vdcn, upper arm currents Ipu, Ipv, Ipw, lower arm currents Inu, Inv, Inw, and cell capacitor voltage Vcap.

Based on each of the received detected values, control device 30 generates a drive command for driving each sub module 7 during a normal operation, and transmits the generated drive command to relay device 40 associated with control device 30. Cell capacitor voltage Vcap is an average of voltage values of DC capacitors 24 detected in respective sub modules 7 of each arm circuit.

The drive command includes a voltage command (an output voltage command value for upper arm 5 and an output voltage command value for lower arm 6 in each leg circuit 4u, 4v, 4w, for example), and a synchronization command for synchronizing respective operations of sub modules 7. The synchronization command is a synchronization pulse based on the phase of AC voltage value Vac during the normal operation.

Control device 30 makes a determination as to whether or not abnormality has occurred to control device 30, and generates abnormality determination information indicating a result of the determination. Typically, control device 30 is configured as a digital protection relay device including, as hardware components, an auxiliary transformer, an AD (Analog to Digital) conversion unit, an operational unit, and a communication interface, for example, and detects abnormality in the operational unit and the AD conversion unit, for example. The operational unit includes a CPU (Central Processing Unit), a RAM (Random Access Memory), and a ROM (Read Only Memory). The AD conversion unit includes an analog filter, a sample and hold circuit, and a multiplexer, for example.

A specific abnormality in the operational unit may be a failure in the CPU. The health of the CPU can be checked by a watch dog timer (WDT). The WDT regularly monitors whether the CPU is operating normally. Typically, when the CPU runs away due to a failure or the like, the CPU no longer regularly transmits a reset signal to the WDT. The WDT detects abnormality in the CPU when a certain time has elapsed since the last reception of the reset signal.

A specific abnormality in the AD conversion unit may be a failure in an input circuit (such as the analog filter and the sample and hold circuit, for example) receiving an input of an electricity amount. For example, the CPU extracts a monitoring signal superimposed on the electricity amount received from the AD conversion unit, and compares an amplitude value of the extracted monitoring signal with a specified value (an amplitude value of a monitoring signal that is output from a harmonic generation circuit, for example). When a difference between the amplitude value of the extracted monitoring signal and the specified value falls in a predetermined range, the CPU determines that the input circuit is operating normally and, when the difference is out of the predetermined range, the CPU determines that abnormality has occurred to the input circuit.

Control device 30 receives, from instruction device 50, system instruction information indicating one of the A system and the B system (i.e., indicating an active system) that is to control operation of each sub module 7. Typically, instruction device 50 receives, from a system manager, an instruction indicating a system that is to operate as an active system, and transmits, to control device 30, system instruction information reflecting the instruction from the system manager. For example, when instruction device 50 receives, from the system manager, an instruction indicating the A system as an active system, instruction device 50 transmits, to control device 30A, system instruction information including an instruction to operate as an active system, and transmits, to control device 30B, system instruction information including an instruction to operate as a standby system.

At each period T1 (100 μs, for example), control device 30 generates a control command 15 for controlling operation of each sub module 7 and transmits the generated control command 15 to relay device 40. Control command 15 includes the aforementioned drive command (i.e., voltage command and synchronization command), the abnormality determination information indicating whether abnormality is present in control device 30, and the system instruction information received from instruction device 50. Period T1 is changed appropriately by control device 30 in accordance with the frequency of the AC system (AC circuit 12, for example) during the normal operation.

At each period T1, relay device 40 transmits, to each sub module 7, control command 15 received from control device 30. More specifically, relay device 40A transmits, to each sub module 7, control command 15 received from control device 30A, and relay device 40B transmits, to each sub module 7, control command 15 received from control device 30B. Relay device 40 may transmit control command 15 to each sub module 7 at each period shorter than period T1.

Typically, relay device 40 may be configured as a dedicated circuit that is partially or entirely configured as an FPGA (Field Programmable Gate Array). Relay device 40 is connected to sub modules 7 through a star-type network.

Example Configuration of Control Device

Figure 3:
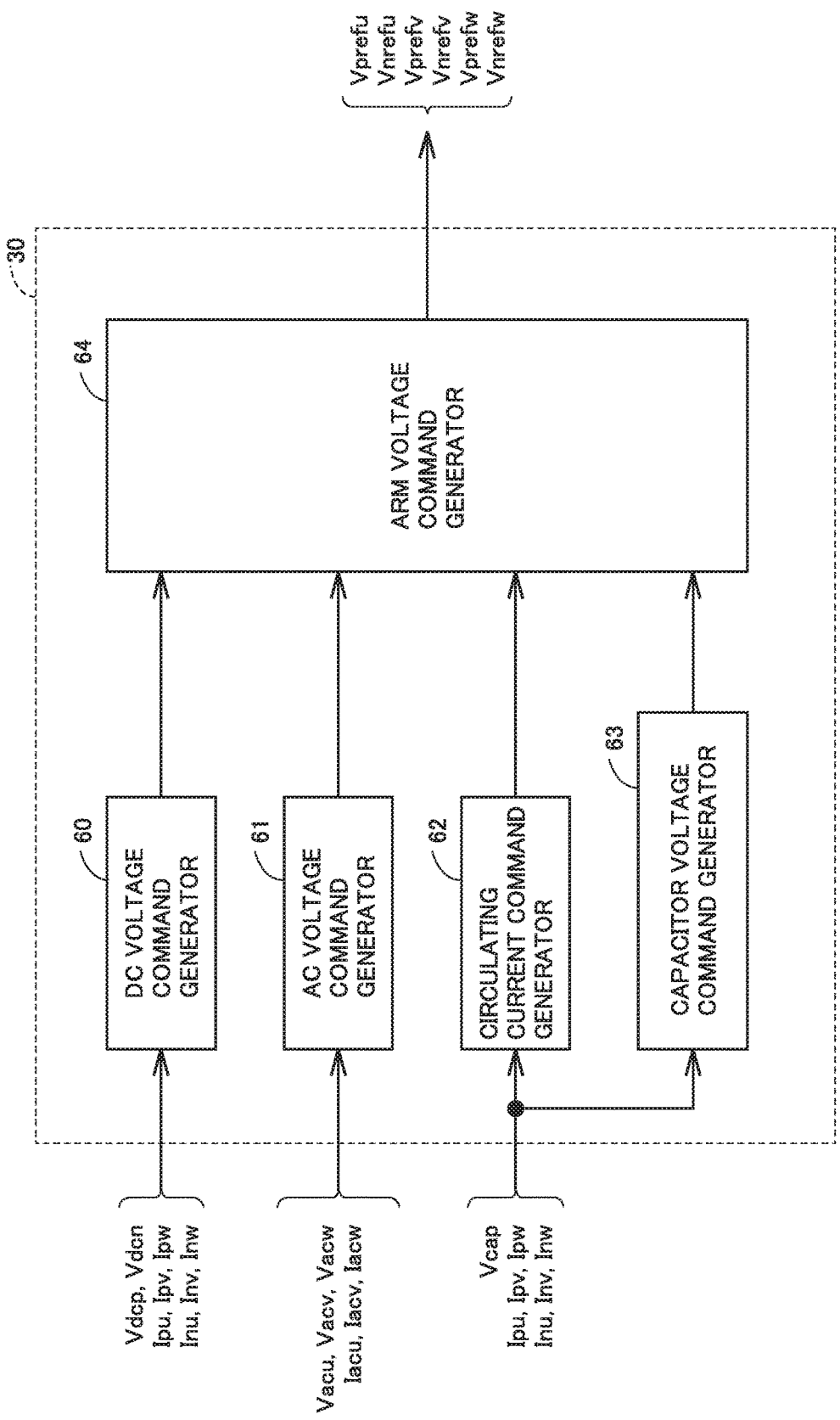
FIG. 3 is a block diagram showing an example configuration of a control device according to Embodiment 1.

FIG. 3 is a block diagram showing an example configuration of control device 30 according to Embodiment 1. Referring to FIG. 3, control device 30 includes a DC voltage command generator 60, an AC voltage command generator 61, a circulating current command generator 62, a capacitor voltage command generator 63, and an arm voltage command generator 64.

DC voltage command generator 60 calculates DC current value Idc based on upper arm currents Ipu, Ipv, Ipw and lower arm currents Inu, Inv, Inw of respective phases. Specifically, DC current value Idc can be calculated by the following expression (1), where Idc_p is the sum of upper arm currents Ipu, Ipv, Ipw, and Idc_n is the sum of lower arm currents Inu, Inv, Inw.

$$Idc = (Idc\_p + Idc\_n)/2 \quad (1)$$

DC voltage command generator 60 generates a DC voltage command value based on DC voltage values Vdcp, Vdcn detected by DC voltage detectors 11A, 11B (also referred to collectively as "DC voltage detector 11" hereinafter) and the calculated DC current value Idc. DC voltage command generator 60 is configured to include a feedback controller that performs feedback control for DC voltage values Vdcp, Vdcn (also referred to collectively as "DC voltage value Vdc" hereinafter) and a feedback controller that performs feedback control for DC current value Idc.

Figure 4:
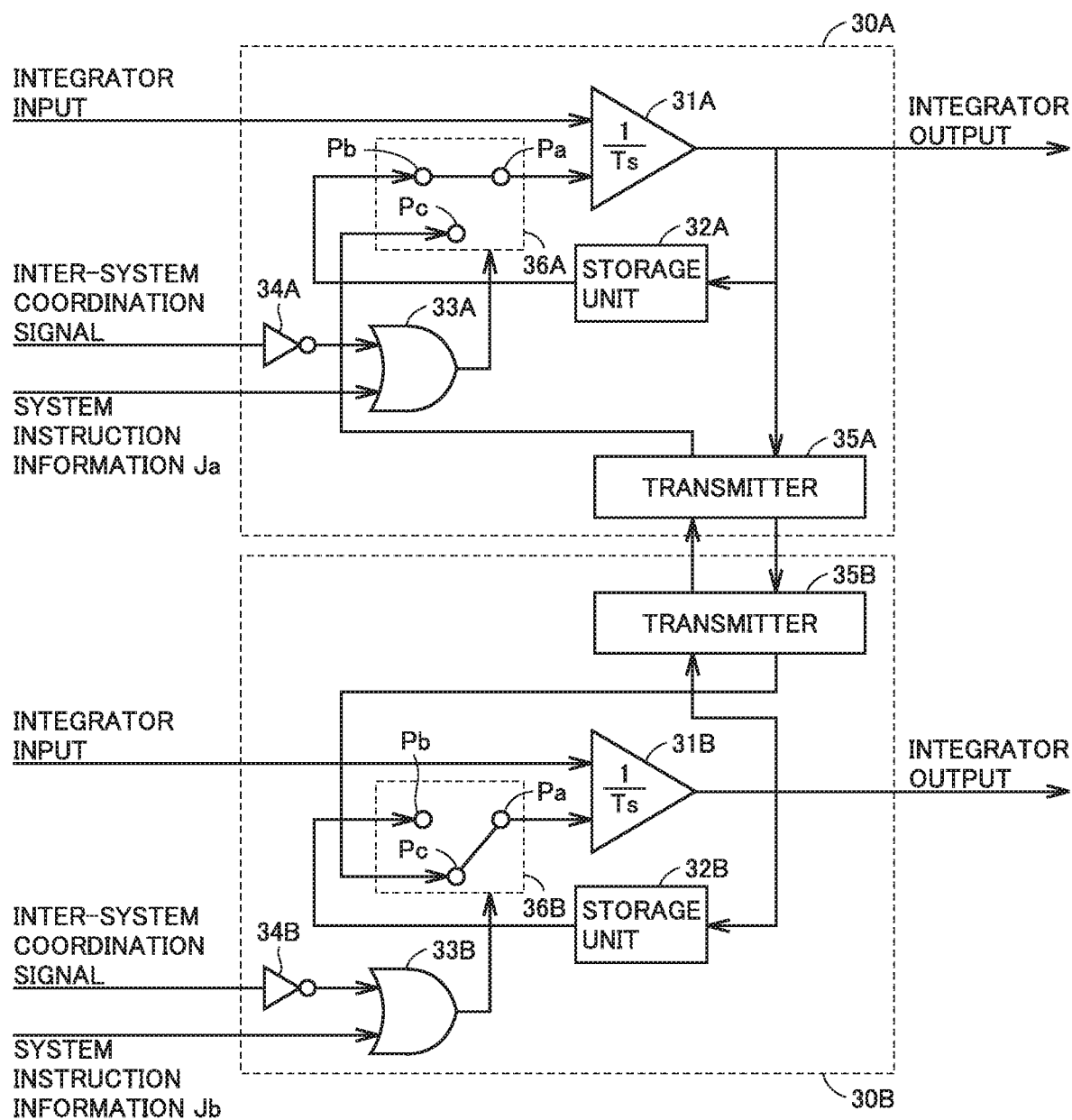
FIG. 4 illustrates feedback control performed by a control device according to Embodiment 1.

FIG. 4 illustrates feedback control performed by the control device according to Embodiment 1. Feedback control for DC voltage Vdc is herein described.

Referring to FIG. 4, control device 30A includes, as functional components for feedback control, an integrator 31A that is a feedback controller, a storage unit 32A configured as a RAM for example, an OR gate 33A, a NOT gate 34A, a transmitter 35A configured as a communication circuit for example, and a switch 36A. Control device 30B includes, as functional components for feedback control, an integrator 31B, a storage unit 32B, an OR gate 33B, a NOT gate 34B, a transmitter 35B, and a switch 36B. The integrator, OR gate, NOT gate, and switch are implemented for example by the CPU of control device 30.

The present output value of the integrator in the present operational cycle is represented by the following expression (2), where y(s) is the integrator's present output value in the present operational cycle, y(s−1) is the integrator's previous output value in the immediately preceding operational cycle, x is an input value of the integrator, T is a time constant, and s is a Laplace operator.

$$y(s) = y(s-1) + x/(T \times s) \quad (2)$$

As an input to integrators 31A, 31B, a difference between a detected value (i.e., DC voltage value Vdc) of DC voltage detector 11 and a target value of the DC voltage value is used. The target value is transmitted from instruction device 50 to control devices 30A, 30B. Control devices 30A, 30B perform a feedback calculation for reducing the difference, using the feedback controllers (herein integrators 31A, 31B).

The output value of integrator 31A is stored in storage unit 32A and also sent through transmitter 35A to transmitter 35B. The output value of integrator 31B is stored in storage unit 32B and also sent through transmitter 35B to transmitter 35A.

Instruction device 50 gives, to control devices 30A, 30B, an instruction to cause the A system and the B system to operate in coordination with each other. Therefore, as an inter-system coordination signal in FIG. 4, "1" is input to NOT gates 34A, 34B, and "0" is input to OR gates 33A, 33B.

It is supposed that instruction device 50 gives, to control devices 30A, 30B, an instruction to cause the A system to operate as an active system. In this case, as system instruction information Ja in FIG. 4A, "1" is input to OR gate 33A. As a result, "1" is output from OR gate 33A to connect a contact Pa and a contact Pb of switch 36A to each other. As system instruction information Jb in FIG. 4, "0" is input to OR gate 33B. As a result, "0" is output from OR gate 33B to connect a contact Pa and a contact Pc of switch 36B to each other.

Thus, in order to manage the A system as an active system and the B system as a standby system, integrator 31A performs the calculation using, as the previous value, the previous output value of integrator 31A stored in storage unit 32A. Integrator 31B performs the calculation using, as the previous value, the previous output value of integrator 31A received through transmitter 35B.

In contrast, in order to manage the A system as a standby system and the B system as an active system, integrator 31A performs the calculation using, as the previous value, the previous output value of integrator 31B received through transmitter 35A. Integrator 31B performs the calculation using, as the previous value, the previous output value of integrator 31B stored in storage unit 32B.

The above-described example in FIG. 4 is an example where the integrator is used as a feedback controller. The present disclosure, however, is not limited to this. The feedback controller may be a PI (Proportional-Integral) controller that is a combination of a proportion instrument and an integrator, or a PID (Proportional-Integral-Differential) controller that is a combination of a proportion instrument, an integrator, and a differentiator, or any other controller.

Referring again to FIG. 3, DC voltage command generator 60 performs similar feedback control for the DC current value as well, by means of the feedback control function described with reference to FIG. 4. DC voltage command generator 60 generates a DC voltage command value based on the calculated DC voltage values Vdcp, Vdcn and the calculated DC current value Idc.

AC voltage command generator 61 generates an AC voltage command value for each phase, based on U phase, V phase, and W phase AC voltage values Vacu, Vacv, and Vacw detected by AC voltage detector 10, and U phase, V phase, and W phase AC current values Iacu, Iacy, and Iacw detected by AC current detector 16. AC voltage command generator 61 is configured in the form of a feedback controller such as PID controller, and generates an AC voltage command value for each phase by performing the feedback control as described with reference to FIG. 4 for each electricity amount used for the calculation.

Circulating current command generator 62 first calculates circulating currents Iccu, Iccv, Iccw flowing in respective leg circuits 4u, 4v, 4w, based on upper arm currents Ipu, Ipv, Ipw and lower arm currents Inu, Inv, Inw of respective phases. The circulating current is current circulating through a plurality of leg circuits 4. For example, circulating current Iccu flowing in U phase leg circuit 4u can be calculated by the following expression (3).

$$Iccu=(Ipu+Inu)/2-Idc/3 \quad (3)$$

The first term in the above expression (3) represents current flowing commonly in upper arm 5 and lower arm 6 of leg circuit 4u. The second term in the above expression (3) represents a corresponding portion of DC current flowing in U phase leg circuit 4u, supposing that DC current value Idc flows equally in each of the leg circuits. Circulating currents Iccv, Iccw can be calculated similarly to circulating current Iccu.

Circulating current command generator 62 calculates a command value for the circulating current of each phase, based on the calculated circulating currents Iccu, Iccv, Iccw for respective phases and cell capacitor voltage Vcap which is an average for each arm circuit. Circulating current command generator 62 is configured in the form of a feedback controller such as PID controller, and generates a command value for the circulating current of each phase by performing the feedback control as described with reference to FIG. 4 for each electricity amount used for the calculation.

Capacitor voltage command generator 63 generates a voltage command value for the DC capacitor of each sub module 7, based on cell capacitor voltage Vcap which is an average for each arm circuit, and upper arm currents Ipu, Ipv, Ipw and lower arm currents Inu, Inv, Inw of respective phases. Capacitor voltage command generator 63 is configured in the form of a feedback controller such as PID controller, and generates a voltage command value for the DC capacitor by performing the feedback control as described with reference to FIG. 4 for each electricity amount used for the calculation.

Arm voltage command generator 64 generates arm voltage command values Vprefu, Vnrefu, Vprefv, Vnrefv, Vprefw, Pnrefw for upper arm 5 and lower arm 6 of each phase. Arm voltage command values Vprefu, Vnrefu, Vprefv, Vnrefv, Vprefw, Pnrefw for respective phases are transmitted as voltage commands to relay device 40. In the following description, arm voltage command values may be referred to simply as arm voltage command values Vpref, Vnref where a particular phase is not specified.

As described above, control device 30 performs feedback calculation for reducing a difference between a target value and a detected value for each electricity amount to be used for controlling power conversion between DC circuit 14 and AC circuit 12.

Specifically, when the system for controlling operation of each sub module is the A system, the feedback calculation by feedback controller FA (integrator 31A for example) included in control device 30A includes an operation of calculating the present output value of feedback controller FA based on the aforementioned difference and the previous output value of feedback controller FA. The feedback calculation by feedback controller FB (integrator 31B for example) included in control device 30B includes an operation of calculating the present output value of feedback controller FB based on the aforementioned difference and the previous output value of feedback controller FA.

By such a feedback calculation, any error between the output voltage command value from the A system and the output voltage command value from the B system that are transmitted to each sub module can be reduced.

Example Configuration of Sub Module

Overall Configuration

Figure 5:
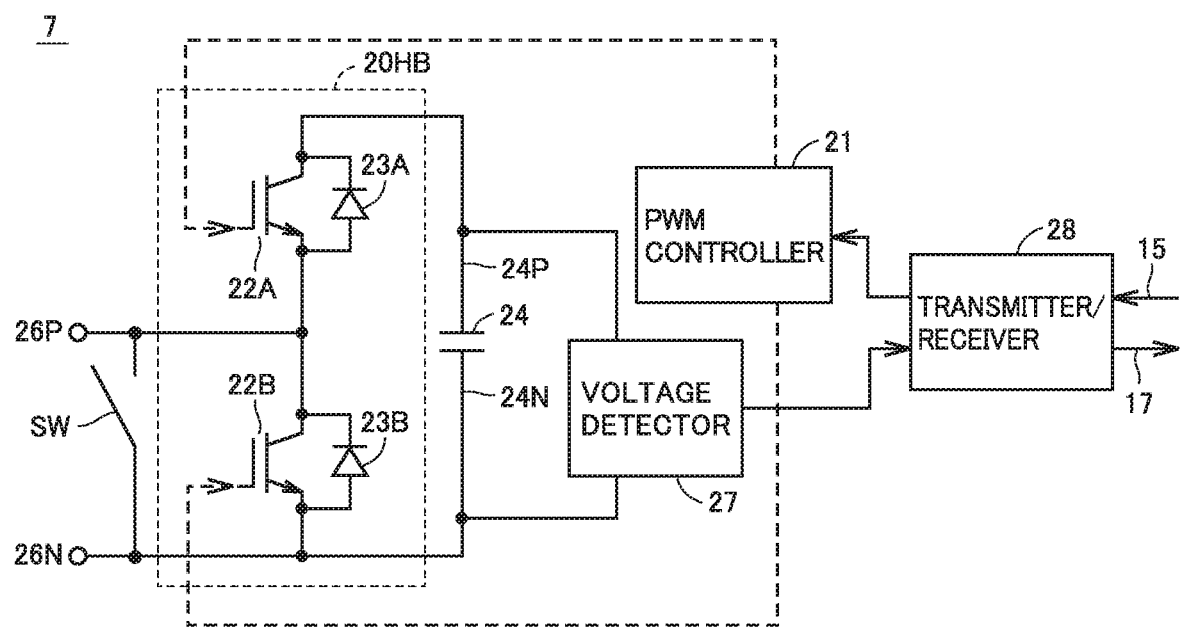
FIG. 5 is a circuit diagram showing an example of sub modules constituting each leg circuit in FIG. 1.

FIG. 5 is a circuit diagram showing an example of the sub modules constituting each leg circuit in FIG. 1. Sub module 7 shown in FIG. 5 includes a half-bridge-type conversion circuit 20HB, a PWM (pulse width modulation) controller 21, a DC capacitor 24 serving as an energy storage, a voltage detector 27, and a transmitter/receiver 28. A series of operations of PWM controller 21, voltage detector 27, and transmitter/receiver 28 is performed at each period T2 (a few microseconds, for example) which is considerably shorter than period T1 of the operational cycle of control device 30.

Half-bridge-type conversion circuit 20HB includes switching elements 22A, 22B that are connected in series to each other, and diodes 23A, 23B. Diodes 23A, 23B are connected in anti-parallel with (in parallel with and in the reverse bias direction relative to) switching elements 22A, 22B, respectively. DC capacitor 24 is connected in parallel with the series-connected circuit of switching elements 22A, 22B and holds a DC voltage. A connection node between switching elements 22A and 22B is connected to a high-potential-side input/output terminal 26P. A connection node between switching element 22B and DC capacitor 24 is connected to a low-potential-side input/output terminal 26N.

Typically, input/output terminal 26P is connected to input/output terminal 26N of adjacent sub module 7 on the positive side. Input/output terminal 26N is connected to input/output terminal 26P of adjacent sub module 7 on the negative side.

As each switching element 22A, 22B, a self-arc-extinguishing-type switching element is used for which both the ON operation and the OFF operation can be controlled. Switching element 22A, 22B is an IGBT (Insulated Gate Bipolar Transistor) or GCT (Gate Commutated Turn-Off thyristor), for example.

A bypass switch SW is connected between input/output terminals 26P and 26N. Bypass switch SW is a switch configured to short-circuit the two terminals of switching element 22B by closing contacts, and thus can pass fault current. Specifically, bypass switch SW short-circuits sub module 7 to thereby protect each of the elements (switching elements 22A, 22B, diodes 23A, 23B, and DC capacitor 24) included in sub module 7 from overcurrent generated in the event of a fault.

Bypass switch SW is also used for short-circuiting sub module 7 in the event of a failure of an element in this sub module 7. Accordingly, even when any sub module 7 of a plurality of sub modules 7 fails, other sub modules 7 can be used to continue operation of power conversion device 1.

Voltage detector 27 detects a voltage (i.e., cell capacitor voltage) across opposite terminals 24P, 24N of DC capacitor 24. Transmitter/receiver 28 transmits, to PWM controller 21, control command 15 received from command generator 3 in FIG. 1, and transmits, to command generator 3, a signal 17 indicating a cell capacitor voltage detected by voltage detector 27. A specific configuration of transmitter/receiver 28 is described later herein.

In accordance with a drive command (namely voltage command and synchronization command) that is input from transmitter/receiver 28, PWM controller 21 performs PWM control for each switching element 22A, 22B. Specifically, PWM controller 21 generates a gate control signal that is a PWM signal in accordance with the drive command, and outputs the gate control signal to each switching element 22A, 22B.

Typically, during a normal operation (namely when zero voltage or positive voltage is output between input/output terminals 26P and 26N), PWM controller 21 controls switching elements 22A, 22B so that one of switching elements 22A, 22B is the ON state and the other is the OFF state. When switching element 22A is the ON state and switching element 22B is the OFF state, the voltage across DC capacitor 24 is applied between input/output terminals 26P and 26N. On the contrary, when switching element 22A is the OFF state and switching element 22B is the ON state, the voltage across input/output terminals 26P and 26N is 0 V.

Sub module 7 can output zero voltage or a positive voltage depending on the voltage of DC capacitor 24, by causing switching elements 22A and 22B to be the ON state alternately. Diodes 23A, 23B are provided for the sake of protection when a reverse-direction voltage is applied to switching elements 22A, 22B.

PWM controller 21, voltage detector 27, and transmitter/receiver 28 may be configured in the form of a dedicated circuit, or using FPGA, for example.

According to the foregoing description, the conversion circuit of sub module 7 is a half-bridge-type conversion circuit. The present disclosure, however, is not limited to this configuration. For example, sub module 7 may be configured using a full-bridge-type conversion circuit or a three-quarters-bridge-type conversion circuit.

Configuration of Transmitter/Receiver

Figure 6:
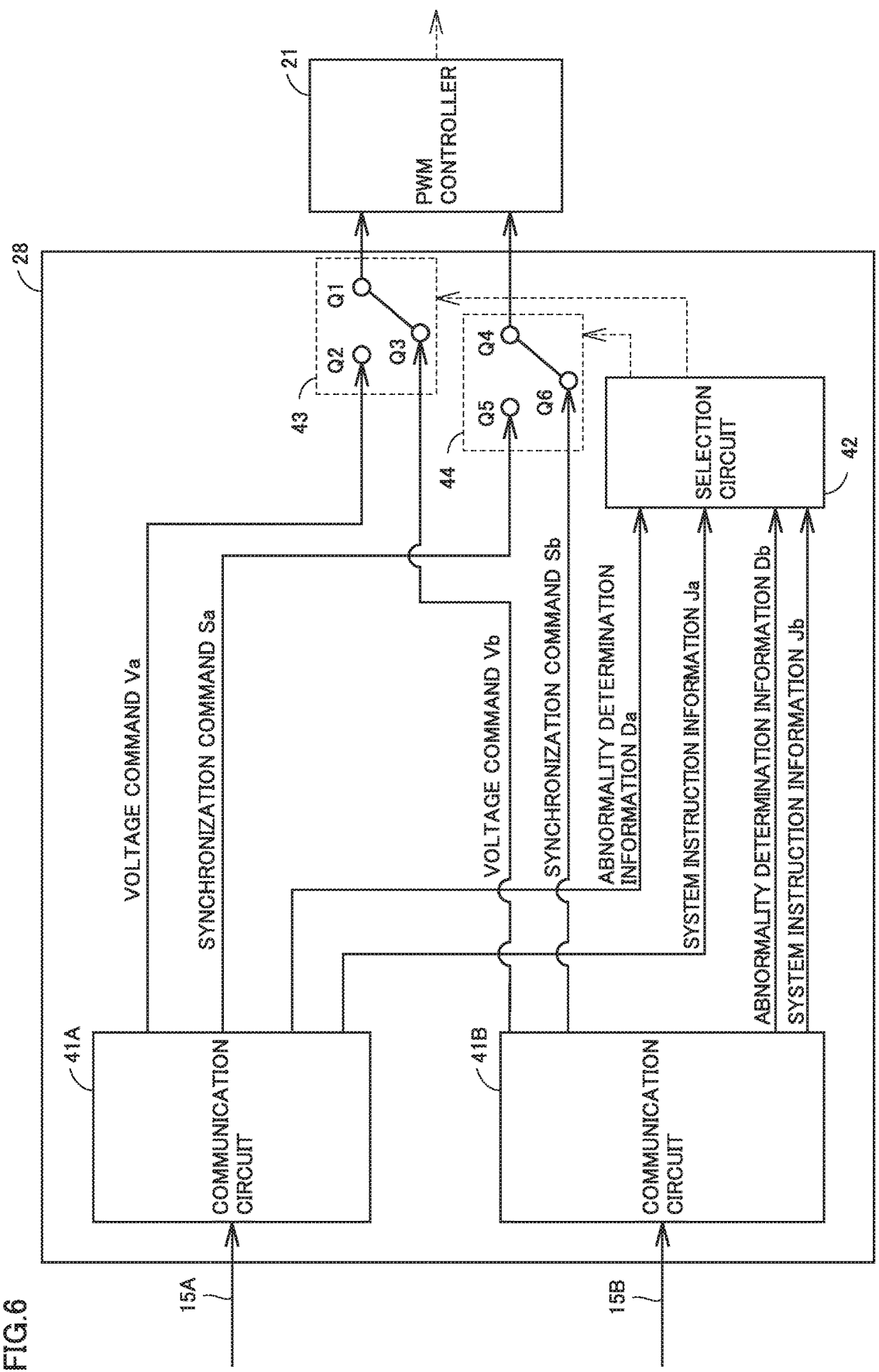
FIG. 6 is a block diagram for illustrating a specific configuration of a transmitter/receiver according to Embodiment 1.

FIG. 6 is a block diagram for illustrating a specific configuration of the transmitter/receiver according to Embodiment 1. Transmitter/receiver 28 includes communication circuits 41A, 41B and a selection circuit 42. In the following, for the sake of convenience, control command 15 generated by control device 30A is referred to as "control command 15A" and control command 15 generated by control device 30B is referred to as "control command 15B."

Communication circuit 41A receives control command 15A transmitted from relay device 40A. Communication circuit 41B receives control command 15B transmitted from relay device 40B. Control command 15A includes voltage command Va, synchronization command Sa, abnormality determination information Da, and system instruction information Ja. Control command 15B includes voltage command Vb, synchronization command Sb, abnormality determination information Db, and system instruction information Jb.

Abnormality determination information Da is information indicating whether or not abnormality has occurred to control device 30A, and abnormality determination information Db is information indicating whether or not abnormality has occurred to control device 30B. System instruction information Ja is information indicating whether the A system is to operate as the active system or the standby system, and system instruction information Jb is information indicating whether the B system is to operate as the active system or the standby system. For example, when system instruction information Ja indicates the active system, system instruction information Jb indicates the standby system.

Based on abnormality determination information Da, Db and system instruction information Ja, Jb, selection circuit 42 selects either the A system or the B system as a system (i.e., active system) that controls operation of each sub module.

When selection circuit 42 selects the A system as the active system, selection circuit 42 outputs a signal to switches 43, 44 so that voltage command Va and synchronization command Sa are input to PWM controller 21. Specifically, selection circuit 42 outputs a signal that causes switch 43 to operate so that a contact Q1 and a contact Q2 are connected to each other, and outputs a signal that causes switch 44 to operate so shat a contact Q4 and a contact Q5 are connected to each other.

When selection circuit 42 selects the B system as the active system, selection circuit 42 outputs a signal to switches 43, 44 so that voltage command Vb and synchronization command Sb are input to PWM controller 21. Specifically, selection circuit 42 outputs a signal that causes switch 43 to operate so that contact Q1 and contact Q3 are connected to each other, and outputs a signal that causes switch 44 to operate so that contact Q4 and contact Q6 are connected to each other.

Next, a selection method employed by selection circuit 42 is described. When selection circuit 42 determines, based on abnormality determination information Da, Db, both control devices 30A and 30B operate normally (i.e., no abnormality has occurred), selection circuit 42 selects the A system or the B system as the active system, in accordance with system instruction information Ja, Jb.

In contrast, when selection circuit 42 determines, based on abnormality determination information Da, Db, one of control devices 30A and 30B operates abnormally, selection circuit 42 selects a system to which abnormality has not occurred, regardless of what is indicated by system instruction information Ja, Jb. Specifically, even when system instruction information Ja indicates the A system as the active system (namely system instruction information Jb indicates the B system as the standby system), selection circuit 42 selects the B system as the active system, in response to occurrence of abnormality in control device 30A that is detected based on abnormality determination information Da (namely abnormality determination information Da indicates that abnormality is present in control device 30A).

PWM controller 21 performs PWM control for each switching element, in accordance with a drive command for the system selected as the active system by selection circuit 42 (for example, in accordance with voltage command Vb and synchronization command Sb for the B system).

Figure 7:
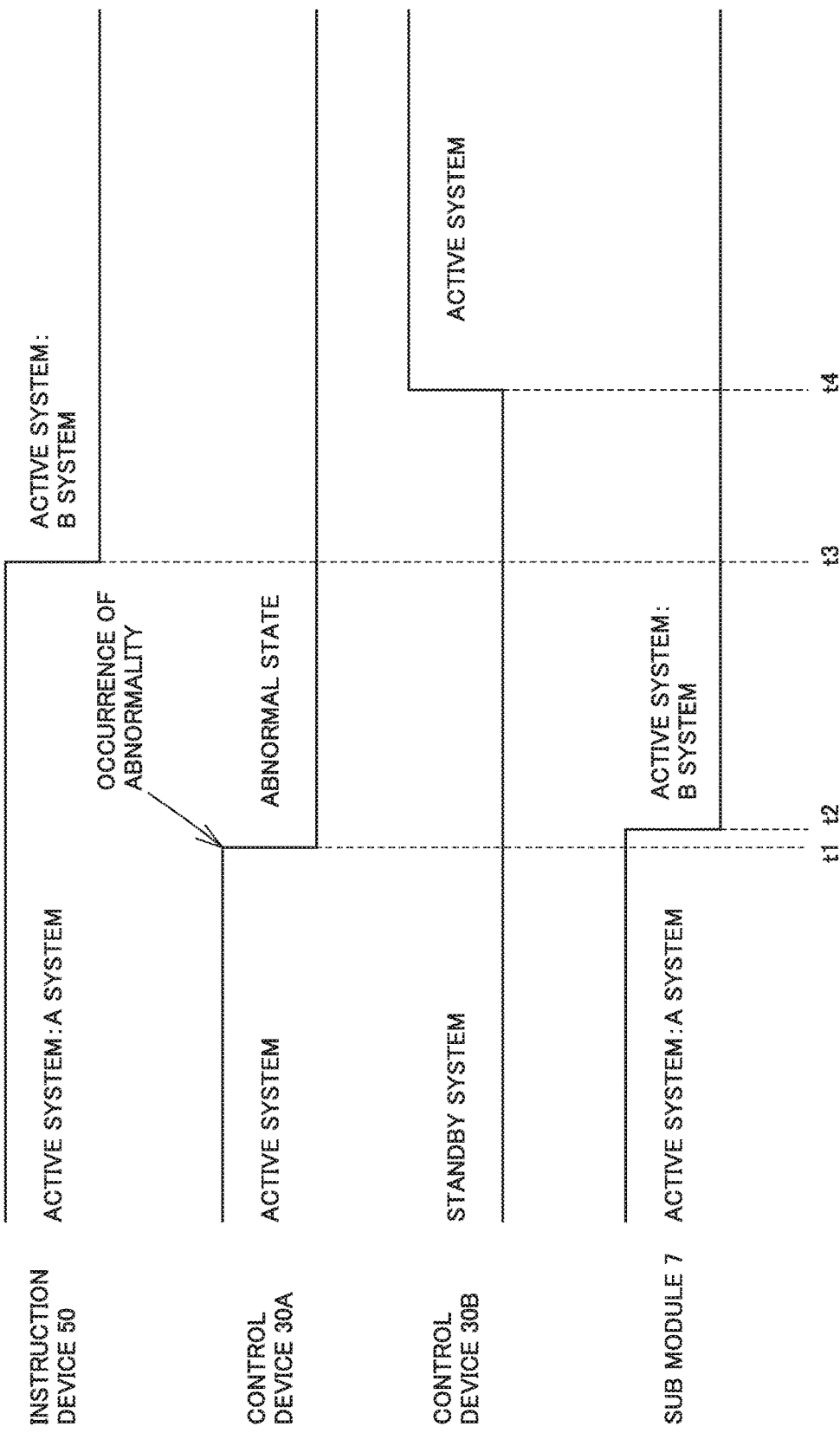
FIG. 7 is a timing chart for illustrating a timing at which system switchover is made by sub modules according to Embodiment 1.

FIG. 7 is a timing chart for illustrating the timing at which system switchover is made by the sub modules according to Embodiment 1.

Referring to FIG. 7, at the start, the A system is managed as the active system and the B system is managed as the standby system. Specifically, instruction device 50 gives an instruction to control devices 30A, 30B to cause the A system to operate as the active system and the B system to operate as the standby system. Control device 30A operates as the active system in accordance with the instruction from instruction device 50, and control device 30B operates as the standby system. Sub module 7 has selected the A system as the active system, and performs PWM control based on voltage command Va and synchronization command Sa.

It is supposed here that abnormality occurs to control device 30A at time t1. Control device 30A transmits, to sub module 7 through relay device 40, control command 15A including abnormality determination information Da indicating that abnormality is present in control device 30A, and system instruction information Ja received at the time when the abnormality occurs. Control device 30A also informs instruction device 50 of the fact that abnormality has occurred to control device 30A (transmits abnormality determination information Da to instruction device 50, for example), so as to urge instruction device 50 to give an instruction to switch the active system. System instruction information Ja received by control device 30A at the time when the abnormality occurs is instruction information for causing the A system to operate as the active system. It is because, at the time when the abnormality occurs, instruction device 50 does not recognize the occurrence of the abnormality to control device 30A.

At time t2, sub module 7 switches the active system from the A system to the B system based on abnormality determination information Da received from control device 30A, and starts PWM control based on voltage command Vb and synchronization command Sb. The operational period of sub module 7 is a very short period of a few microseconds, and therefore, immediately after receiving abnormality determination information Da from control device 30A, sub module 7 can start PWM control based on voltage command Vb and synchronization command Sb for the sound B system.

At time t3, instruction device 50 transmits, to control device 30B, system instruction information Jb including an instruction to switch the active system from the A system to the B system, based on abnormality determination information Da received from control device 30A. At time t4, control device 30B starts operating as the active system, in accordance with system instruction information Jb received from instruction device 50. At this time, system instruction information Jb transmitted from control device 30B to sub module 7 indicates the active system.

In the present embodiment, sub module 7 is given a system selection function and a PWM control function, and therefore, the abnormal system can be switched immediately to the sound system and PWM control using the control command for the sound system can be started immediately.

As a comparative example, it is supposed that control device 30 is given a system switch function and a PWM control function. The timing at which control device 30B can start operating as the active system in accordance with the instruction from instruction device 50 is time t4. In other words, until time t4 is reached, control device 30B cannot switch the active system from the A system to the B system, nor perform the PWM control using a drive command for the sound B system. This means that sub module 7 cannot operate normally for a long period of time from time t1 of occurrence of abnormality to time t4. This exerts a great influence on DC circuit 14 and AC circuit 12, and it is inevitable to stop sub module 7 temporarily.

In contrast, in the present embodiment, sub module 7 is capable of performing PWM control using a drive command for the sound system almost simultaneously with occurrence of abnormality. This exerts a small influence on DC circuit 14 and AC circuit 12, and it is possible to continue operation without stopping sub module 7.

Advantages

In accordance with Embodiment 1, the system switchover function and the PWM control function are provided in sub module 7, and therefore, the system switchover can be made without waiting for system instruction information from instruction device 50 when abnormality occurs to control device 30. The operational cycle of sub module 7 is considerably shorter than the operational cycle of control device 30 and instruction device 50. Thus, receiving the information that abnormality has occurred, sub module 7 can immediately make system switchover and start the PWM control. Accordingly, management of the power system can be continued without stopping sub module 7 in making system switchover.

Moreover, relay device 40 is connected to each of sub modules 7 by the star connection, and therefore, even when a transmission path from relay device 40 to any of sub modules 7 fails, operation can be continued. Further, sub module 7 has bypass switch SW, and therefore, even when an element in any sub module 7 fails, this sub module 7 can be short-circuited to continue operation by using other sub modules 7.

Further, the system switchover function is provided in sub module 7, and therefore, the system switchover can be accomplished in the same hardware. Thus, the system can be switched based on one hardware clock signal as a reference, and therefore, the system can be switched smoothly.

Embodiment 2

Control commands 15A, 15B transmitted from control devices 30A, 30B are output simultaneously at each period T1, and therefore, basically the synchronization timing based on synchronization command Sa is regarded as coinciding with the synchronization timing based on synchronization command Sb.

Control command 15 is transmitted by an optical fiber from control device 30 through relay device 40 to each sub module. If the transmission time from control device 30A to each sub module 7 differs from the transmission time from control device 30B to the sub module 7, there is a possibility that an error is generated between the synchronization timing based on synchronization command Sa and the synchronization timing based on synchronization command Sb. In connection with Embodiment 2, a method for correcting the synchronization timing when the system is switched is described.

Figure 8:
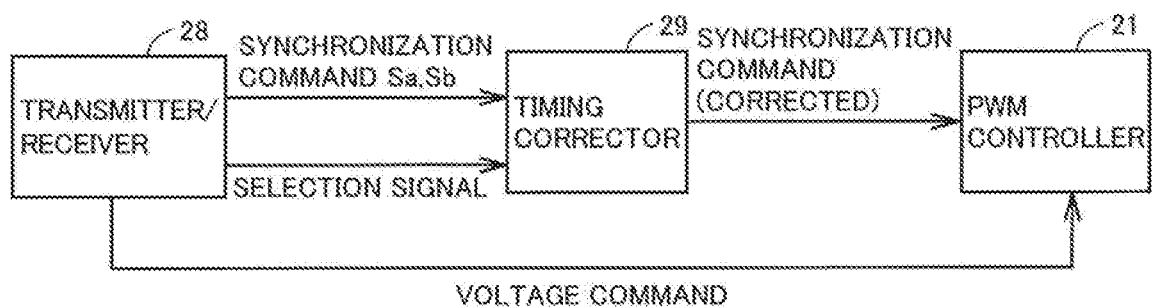
FIG. 8 shows an example configuration of a sub module according to Embodiment 2.

FIG. 8 shows an example configuration of sub module 7 according to Embodiment 2. Referring to FIG. 8, sub module 7 according to Embodiment 2 has a configuration additionally including a timing corrector 29 as compared with the configuration of sub module 7 shown in FIG. 5.

Timing corrector 29 receives input of a selection signal indicating a system selected as the active system by selection circuit 42, and synchronization commands Sa and Sb. Based on the selection signal and synchronization commands Sa and Sb, timing corrector 29 corrects the synchronization timing of the synchronization command to be used by PWM controller 21. Timing corrector 29 outputs the corrected synchronization command to PWM controller 21. In the following, a correction method for timing corrector 29 is described.

Figure 9:
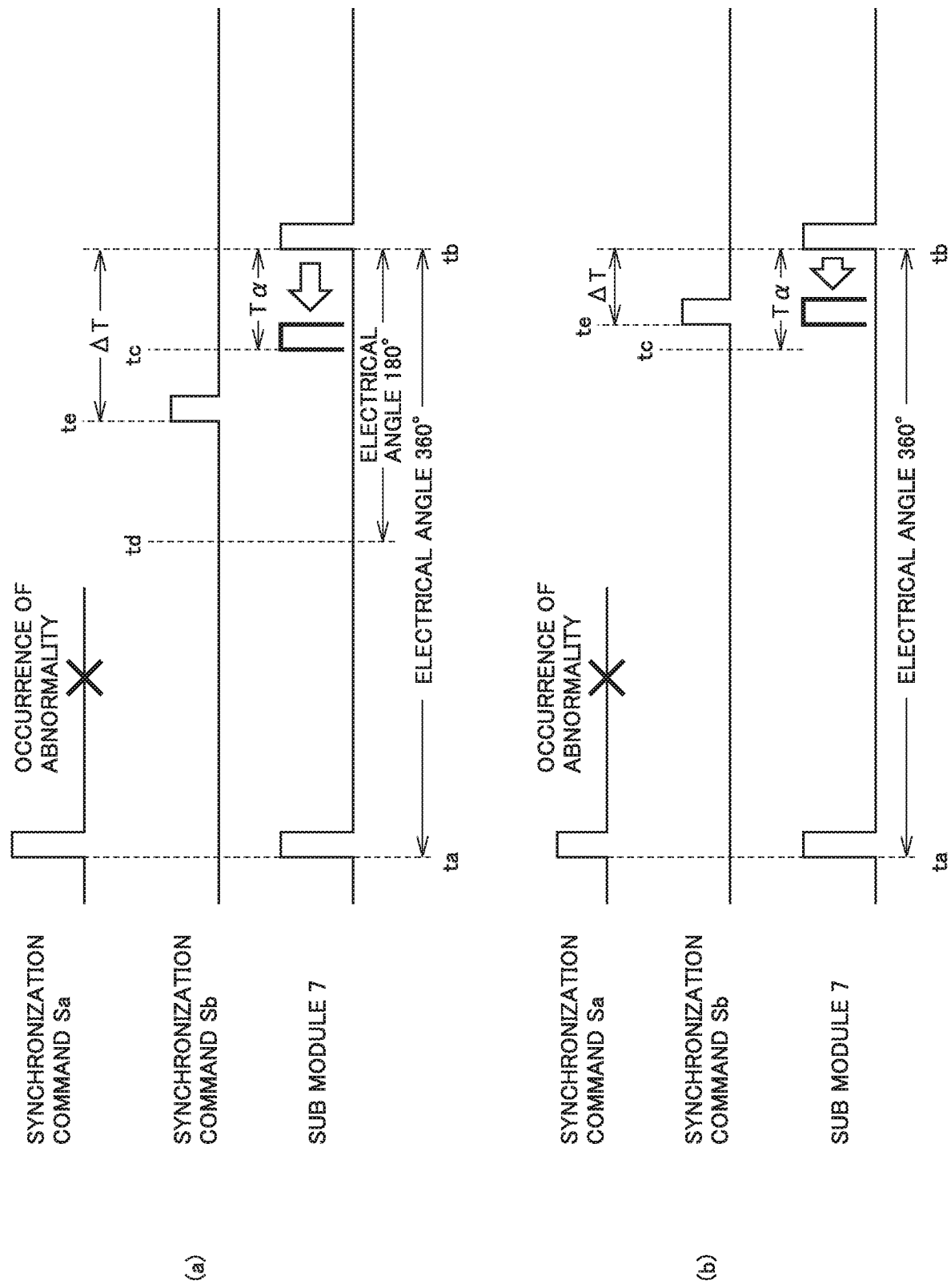
FIG. 9 shows an example of the synchronization timing correction method according to Embodiment 2.

FIG. 9 shows an example of the synchronization timing correction method according to Embodiment 2. It is supposed here that abnormality occurs to the A system acting as the active system and the active system is switched to the B system. FIG. 9 shows the synchronization timing of synchronization command Sa, the synchronization timing of synchronization command Sb, and the synchronization timing used for sub module 7. In the example in FIG. 9, it is supposed that the synchronization timing of synchronization command Sb for the system (B system in this case) to which the active system is switched occurs earlier than the synchronization timing of synchronization command Sa for the system (A system in this case) from which the active system is switched.

At time ta, the A system is the active system, and sub module 7 thus operates in accordance with the synchronization timing of synchronization command Sa. When abnormality thereafter occurs to the A system, sub module 7 switches the active system to the B system. At this time, based on the time difference between the synchronization timing of synchronization command Sa and the synchronization timing of synchronization command Sb, timing corrector 29 gradually shifts the synchronization timing (hereinafter also referred to as "synchronization timing ST") of the synchronization command to be used for PWM controller 21 toward the synchronization timing of synchronization command Sb.

Specifically, referring to FIG. 9(a), before abnormality occurs to the A system, the synchronization timing used for sub module 7 (specifically PWM controller 21) is time ta. If abnormality does not occur to the A system, the next synchronization timing is presumed to be time tb at which an electrical angle of 360° has elapsed since time ta. Timing corrector 29 provided in sub module 7 determines that time te that is a synchronization timing of synchronization command Sb is located between time td and time tc, where time td precedes time tb by an electrical angle of 180° and time tc precedes time tb by reference time Tα. In this case, timing corrector 29 shifts synchronization timing ST to time tc preceding time tb by reference time Tα, rather than making ST coincident with the synchronization timing (i.e., time te) of synchronization command Sb.

In contrast, in the case of FIG. 9(b), timing corrector 29 determines that time te that is a synchronization timing of synchronization command Sb is located between time tc and time tb. In this case, timing corrector 29 makes synchronization timing ST coincident with the synchronization timing (i.e., time te) of synchronization command Sb.

Time difference ΔT between time te and time tb corresponds to an error between the synchronization timing of synchronization command Sa and the synchronization timing of synchronization command Sb. Therefore, when time difference ΔT is larger than reference time Tα (i.e., in the case of FIG. 9(a)), timing corrector 29 shifts synchronization timing ST by reference time Tα in the direction toward the synchronization timing of synchronization command Sb (i.e., the direction of reducing time difference ΔT). In contrast, when time difference ΔT is less than or equal to reference time Tα (i.e., in the case of FIG. 9(b)), timing corrector 29 shifts synchronization timing ST so that ST is coincident with the synchronization timing of synchronization command Sb.

Figure 10:
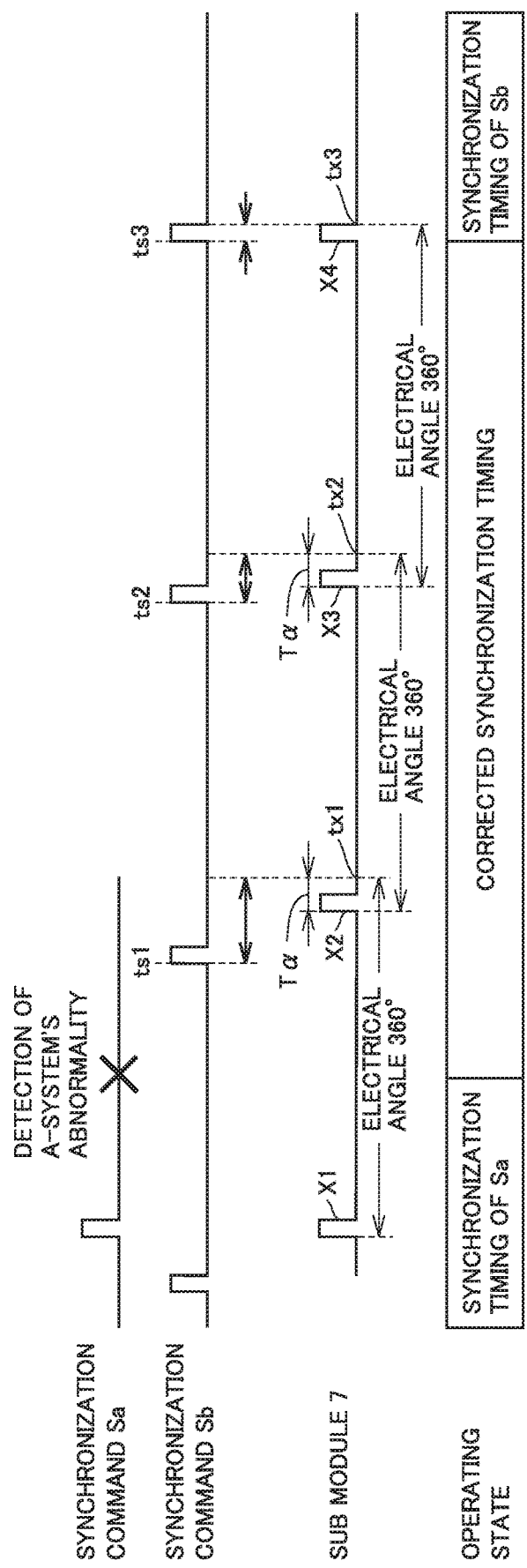
FIG. 10 shows an example of correction of the synchronization timing using the correction method in FIG. 9.

FIG. 10 shows an example of correction of the synchronization timing using the correction method in FIG. 9. Referring to FIG. 10, the rise timing (i.e., synchronization timing) of first synchronization pulse X1 used for sub module 7 coincides with the synchronization timing of synchronization command Sa, and sub module 7 operates in accordance with synchronization command Sa. When abnormality thereafter occurs to the A system, selection circuit 42 switches the active system to the B system.

The position of second synchronization pulse X2 is the position corrected by timing corrector 29 based on the time difference between synchronization command Sa and synchronization command Sb. Specifically, the time difference between time tx1 at which an electrical angle of 360° has elapsed since the rise time of synchronization pulse X1, and rise time ts1 of synchronization command Sb, is larger than reference time Tα. Therefore, the rise time of synchronization pulse X2 is the time preceding time tx1 by reference time Tα. Likewise, the rise time of third synchronization pulse X3 precede time tx2 by reference time Tα. Time tx2 is the time at which an electrical angle of 360° has elapsed since the rise time of synchronization pulse X2.

Next, the time difference between time tx3 at which an electrical angle of 360° has elapsed since the rise time of synchronization pulse X3, and rise time ts3 of synchronization command Sb, is smaller than reference time Tα. Therefore, the rise time of fourth synchronization pulse X4 coincides with rise time ts3 of synchronization command Sb.

Figure 11:
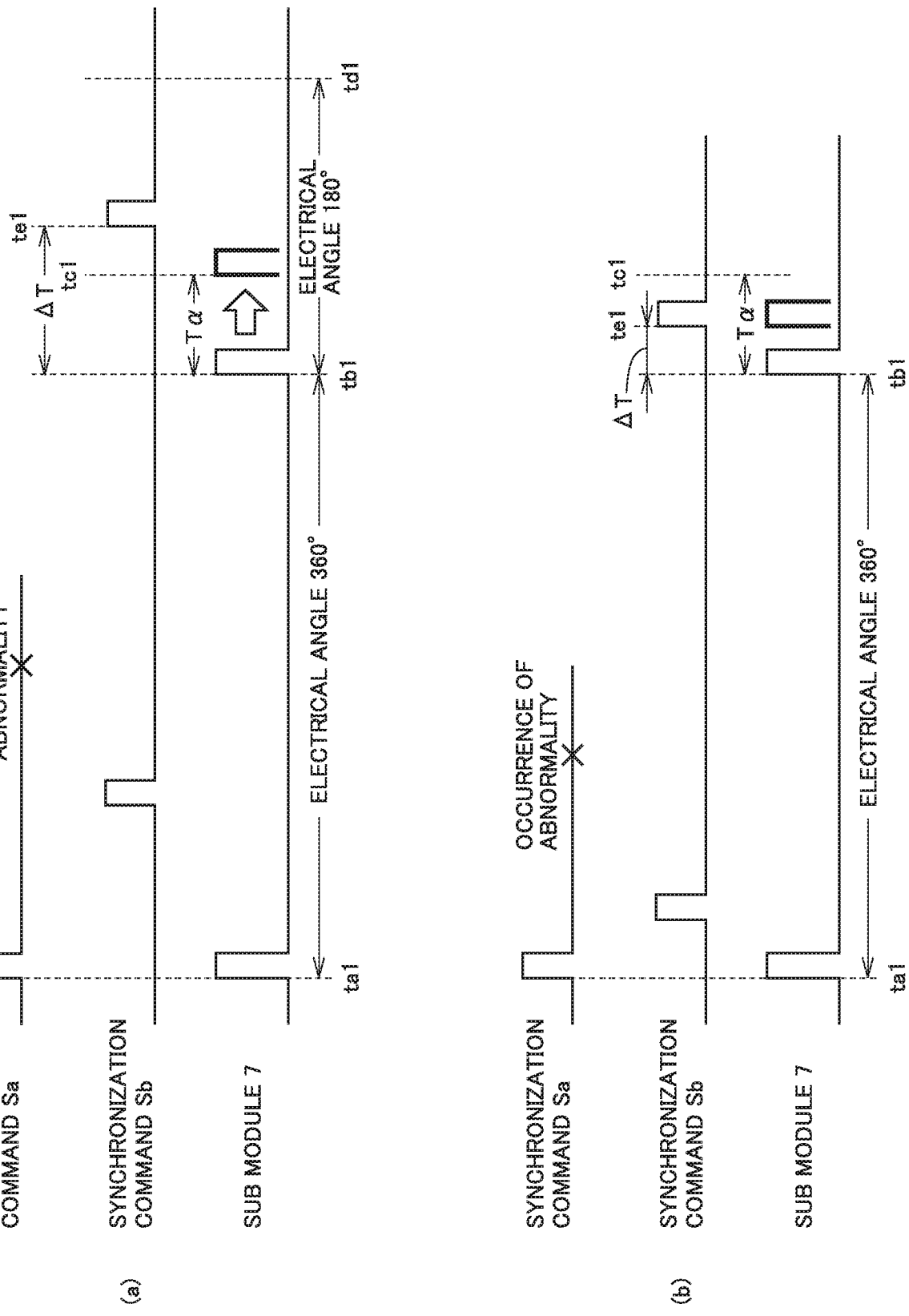
FIG. 11 shows another example of the synchronization timing correction method according to Embodiment 2.

FIG. 11 shows another example of the synchronization timing correction method according to Embodiment 2. Similarly to FIG. 9, it is supposed that abnormality occurs to the A system acting as the active system and the active system is switched to the B system. In the example in FIG. 11, it is supposed that the synchronization timing of synchronization command Sb for the system (B system in this case) to which the active system is switched occurs later than the synchronization timing of synchronization command Sa for the system (A system in this case) from which the active system is switched.

At time ta1, the A system is the active system, and sub module 7 thus operates in accordance with the synchronization timing of synchronization command Sa. When abnormality thereafter occurs to the A system, sub module 7 switches the active system to the B system. At this time, timing corrector 29 gradually shifts synchronization timing ST to be used for PWM controller 21 from the synchronization timing of synchronization command Sa toward the synchronization timing of synchronization command Sb.

Specifically, referring to FIG. 11(a), before abnormality occurs to the A system, synchronization timing ST is time ta1. If abnormality does not occur to the A system, the next synchronization timing ST is presumed to be time tb1 at which an electrical angle of 360° has elapsed since time ta1. Timing corrector 29 determines that time te1 that is a synchronization timing of synchronization command Sb is located between time tc1 and time td1, where time tc1 is the time at which reference time Tα has elapsed since time tb1, and time td1 is the time at which an electrical angle of 180° has elapsed since time tb1. In this case, timing corrector 29 shifts synchronization timing ST to time tc1 at which reference time Tα has elapsed since time tb1, rather than making ST coincident with the synchronization timing (i.e., time te1) of synchronization command Sb.

In contrast, in the case of FIG. 11(b), timing corrector 29 determines that time te1 that is a synchronization timing of synchronization command Sb is located between time tb1 and time tc1. In this case, timing corrector 29 makes synchronization timing ST coincident with the synchronization timing (i.e., time te1) of synchronization command Sb.

Thus, when time difference ΔT is larger than reference time Tα (i.e., in the case of FIG. 11(a)), timing corrector 29 shifts synchronization timing ST by reference time Tα in the direction toward the synchronization timing of synchronization command Sb. In contrast, when time difference ΔT is less than or equal to reference time Tα (i.e., in the case of FIG. 11(b)), timing corrector 29 shifts synchronization timing ST so that ST is coincident with the synchronization timing of synchronization command Sb.

Figure 12:
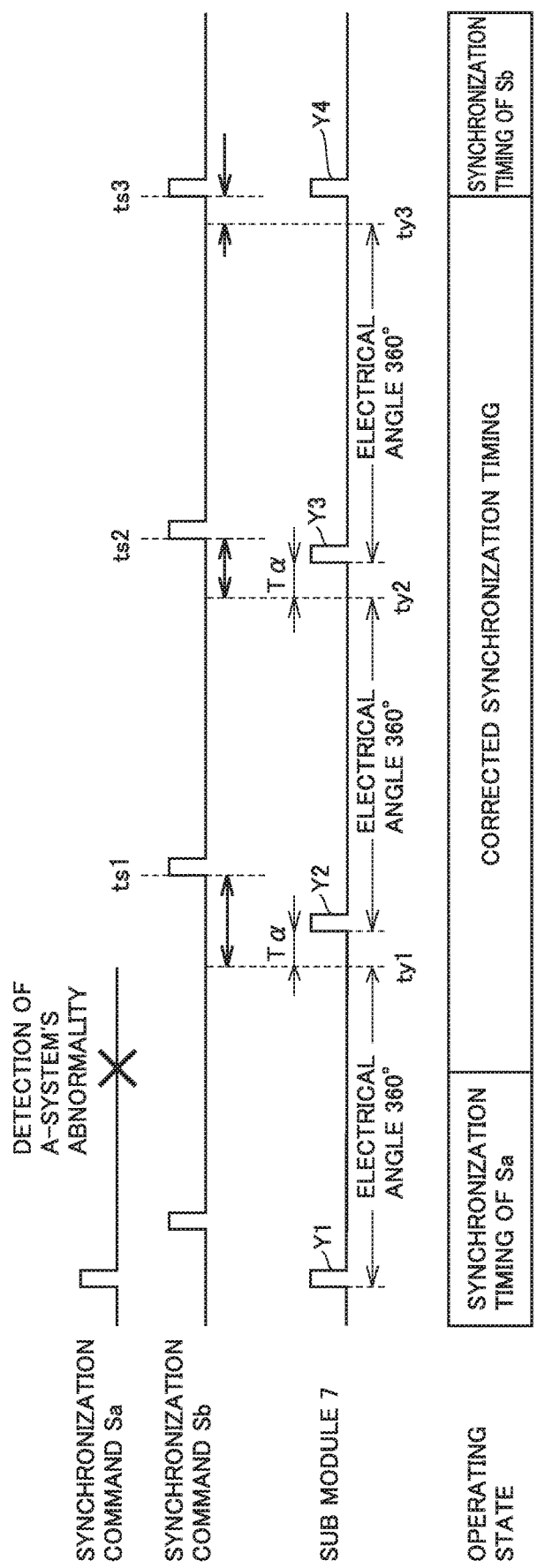
FIG. 12 shows an example of correction of the synchronization timing using the correction method in FIG. 11.

FIG. 12 shows an example of correction of the synchronization timing using the correction method in FIG. 11. Referring to FIG. 12, the rise timing of first synchronization pulse Y1 used for sub module 7 coincides with the synchronization timing of synchronization command Sa, and sub module 7 operates in accordance with synchronization command Sa. When abnormality thereafter occurs to the A system, selection circuit 42 switches the active system to the B system.

The time difference between time ty1 at which an electrical angle of 360° has elapsed since the rise time of synchronization pulse Y1, and rise time ts1 of synchronization command Sb, is larger than reference time Tα. Therefore, the rise time of synchronization pulse Y2 is the time at which reference time Tα has elapsed since time ty1. Likewise, the rise time of synchronization pulse Y3 is the time at which reference time Tα has elapsed since time ty2. Time ty2 is the time at which an electrical angle of 360° has elapsed since the rise time of synchronization pulse Y2.

Next, the time difference between time ty3 at which an electrical angle of 360° has elapsed since the rise time of synchronization pulse Y3, and rise time ts3 of synchronization command Sb, is smaller than reference time Tα. Therefore, the rise time of synchronization pulse Y4 coincides with rise time ts3 of synchronization command Sb.

Thus, as to the voltage command, when the active system is switched from the A system to the B system, PWM controller 21 uses voltage command Vb for the system (B system in this case) to which the active system is switched. As to the synchronization timing, PWM controller 21 uses the synchronization timing corrected by timing corrector 29, rather than immediately using the synchronization timing of synchronization command Sb. After the correction by timing corrector 29 is completed, PWM controller 21 operates in accordance with the synchronization timing of synchronization command Sb.

Regarding FIGS. 9 to 12, it is supposed that abnormality occurs to either one of the A system and the B system and the active system is switched between them. The present disclosure, however, is not limited to this. For example, the above-described synchronization timing correction method may be applied to the situation where abnormality occurs to none of the A system and the B system and the active system is switched in accordance with the system instruction information.

Advantages

In accordance with Embodiment 2, the synchronization timing used for sub module 7 is shifted gradually, when an error is generated between the synchronization timing based on the synchronization command for the system from which the active system is switched, and the synchronization timing based on the synchronization command for the system to which the active system is switched. Accordingly, the operation of sub module 7 in switching the system can be made stable.

OTHER EMBODIMENTS

In the above-described embodiments, each detector that detects the electricity amount used for control may have a duplex configuration.

In the above-described embodiments, while control device 30 and relay device 40 are described as having a duplex configuration, they are not limited to this configuration. Control device 30 and relay device 40 may have a triplex or higher multiplex configuration.

The configuration illustrated above by way of example in connection with each of above-described embodiments is an example configuration of the present invention, and can be combined with another known technique, or the configuration can be modified by being omitted partially, for example, without going beyond the scope of the present invention.

Moreover, each embodiment described above may be implemented by appropriately introducing, into the embodiment, a process(es) and/or a configuration(s) described above in connection with other embodiments.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 power conversion device; 2 power conversion circuitry; 3 command generator; 4u, 4v, 4w leg circuit; 5 upper arm; 6 lower arm; 7 sub module; 8A, 8B reactor; 9A, 9B arm current detector; 10 AC voltage detector; 11A, 11B DC voltage detector; 12 AC circuit; 13 interconnection transformer; 14 DC circuit; 15 control command; 16 AC current detector; 17 signal; 20HB conversion circuit; 21 PWM controller; 22A, 22B switching element; 23A, 23B diode; 24 DC capacitor; 26N, 26P input/output terminal; 27 voltage detector; 28 transmitter/receiver; 29 timing corrector; 30A, 30B control device; 31A, 31B integrator; 32A, 32B storage unit; 35A, 35B transmitter; 36A, 36B, 43, 44 switch; 40A, 40B relay device; 41A, 41B communication circuit; 42 selection circuit; 50 instruction device; 60 DC voltage command generator; 61 AC voltage command generator; 62 circulating current command generator; 63 capacitor voltage command generator; 64 arm voltage command generator

The invention claimed is:

1. A power conversion device that performs power conversion between a DC circuit and an AC circuit, the power conversion device comprising:
   power conversion circuitry including a plurality of sub modules connected in series to each other;
   a first control device and a second control device to generate a first control command and a second control command respectively for controlling operation of each of the sub modules; and
   a first relay device and a second relay device to transmit the first control command and the second control command respectively to each of the sub modules, wherein
   the first control device and the second control device receive, from a predetermined external device, instruction information indicating either a first system or a second system, as a system that controls operation of each of the sub modules, wherein the first system includes the first control device and the first relay device, and the second system includes the second control device and the second relay device,
   each of the first control command and the second control command includes:
      a drive command for driving a switching element included in each of the sub modules;
      abnormality determination information indicating whether abnormality is present in a control device; and the instruction information,
each of the sub modules includes:
a PWM controller to perform PWM control for the switching element; and
a selector to select either the first system or the second system, based on the abnormality determination information and the instruction information that are included in each of the first control command and the second control command,
the selector selects the second system as a system to control operation of each of the sub modules, in response to occurrence of abnormality to the first control device that is detected based on the abnormality determination information of the first control command, even when the instruction information indicates the first system, and
the PWM controller performs PWM control for the switching element in accordance with the drive command included in the second control command for the selected second system.

2. The power conversion device according to claim 1, wherein the first control command and the second control command are transmitted to each of the sub modules at a first period, and a series of operations by the selector and the PWM controller of each of the sub modules is performed at a second period shorter than the first period.

3. The power conversion device according to claim 2, wherein
when no abnormality occurs to the first control device and the second control device, the selector selects either the first system or the second system in accordance with the instruction information.

4. The power conversion device according to claim 2, wherein
the first control device and the second control device
receive input of a detected value of an electricity amount used for controlling power conversion between the DC circuit and the AC circuit, and
perform a feedback calculation, using a feedback controller, for reducing a difference between a target value and the detected value of the electricity amount,
when the first system controls operation of each of the sub modules,
the feedback calculation performed by a first feedback controller of the first control device includes a calculation of determining a present output value of the first feedback controller, based on the difference and a previous output value of the first feedback controller, and
the feedback calculation performed by a second feedback controller of the second control device includes a calculation of determining a present output value of the second feedback controller based on the difference and the previous output value of the first feedback controller.

5. The power conversion device according to claim 2, wherein the drive command includes a synchronization command for synchronizing respective operations of the sub modules, each of the sub modules further includes a timing corrector to correct a synchronization timing used for the PWM controller, and when the selector switches a system that controls operation of each of the sub modules from the first system to the second system, the timing corrector gradually shifts a synchronization timing used for the PWM controller toward a synchronization timing of a second synchronization command, based on a time difference between a synchronization timing of a first synchronization command included in the first control command and the synchronization timing of the second synchronization command included in the second control command.

6. The power conversion device according to claim 2, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including first multiple sub modules among the plurality of sub modules, the first multiple sub modules being connected in series to each other between the connecting part and the high-potential-side DC terminal; and
a lower arm including second multiple sub modules among the plurality of sub modules, the second multiple sub modules being connected in series to each other between the connecting part and the low-potential-side DC terminal, and
the drive command includes an output voltage command value for the upper arm, and an output voltage command value for the lower arm.

7. The power conversion device according to claim 2, wherein the first relay device and the second relay device are connected to each of the sub modules through a star-type network.

8. The power conversion device according to claim 1, wherein
when no abnormality occurs to the first control device and the second control device, the selector selects either the first system or the second system in accordance with the instruction information.

9. The power conversion device according to claim 8, wherein
the first control device and the second control device
receive input of a detected value of an electricity amount used for controlling power conversion between the DC circuit and the AC circuit, and
perform a feedback calculation, using a feedback controller, for reducing a difference between a target value and the detected value of the electricity amount,
when the first system controls operation of each of the sub modules,
the feedback calculation performed by a first feedback controller of the first control device includes a calculation of determining a present output value of the first feedback controller, based on the difference and a previous output value of the first feedback controller, and
the feedback calculation performed by a second feedback controller of the second control device includes a calculation of determining a present output value of the second feedback controller based on the difference and the previous output value of the first feedback controller.

10. The power conversion device according to claim 8, wherein the drive command includes a synchronization command for synchronizing respective operations of the sub modules, each of the sub modules further includes a timing corrector to correct a synchronization timing used for the PWM controller, and when the selector switches a system that controls operation of each of the sub modules from the first system to the second system, the timing corrector gradually shifts a synchronization timing used for the PWM controller toward a synchronization timing of a second synchronization command, based on a time difference between a synchronization timing of a first synchronization command included in the first control command and the synchronization timing of the second synchronization command included in the second control command.

11. The power conversion device according to claim 8, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including first multiple sub modules among the plurality of sub modules, the first multiple sub modules being connected in series to each other between the connecting part and the high-potential-side DC terminal; and
a lower arm including second multiple sub modules among the plurality of sub modules, the second multiple sub modules being connected in series to each other between the connecting part and the low-potential-side DC terminal, and
the drive command includes an output voltage command value for the upper arm, and an output voltage command value for the lower arm.

12. The power conversion device according to claim 1, wherein
the first control device and the second control device
receive input of a detected value of an electricity amount used for controlling power conversion between the DC circuit and the AC circuit, and
perform a feedback calculation, using a feedback controller, for reducing a difference between a target value and the detected value of the electricity amount,
when the first system controls operation of each of the sub modules,
the feedback calculation performed by a first feedback controller of the first control device includes a calculation of determining a present output value of the first feedback controller, based on the difference and a previous output value of the first feedback controller, and
the feedback calculation performed by a second feedback controller of the second control device includes a calculation of determining a present output value of the second feedback controller based on the difference and the previous output value of the first feedback controller.

13. The power conversion device according to claim 12, wherein the drive command includes a synchronization command for synchronizing respective operations of the sub modules, each of the sub modules further includes a timing corrector to correct a synchronization timing used for the PWM controller, and when the selector switches a system that controls operation of each of the sub modules from the first system to the second system, the timing corrector gradually shifts a synchronization timing used for the PWM controller toward a synchronization timing of a second synchronization command, based on a time difference between a synchronization timing of a first synchronization command included in the first control command and the synchronization timing of the second synchronization command included in the second control command.

14. The power conversion device according to claim 12, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including first multiple sub modules among the plurality of sub modules, the first multiple sub modules being connected in series to each other between the connecting part and the high-potential-side DC terminal; and
a lower arm including second multiple sub modules among the plurality of sub modules, the second multiple sub modules being connected in series to each other between the connecting part and the low-potential-side DC terminal, and
the drive command includes an output voltage command value for the upper arm, and an output voltage command value for the lower arm.

15. The power conversion device according to claim 1, wherein the drive command includes a synchronization command for synchronizing respective operations of the sub modules, each of the sub modules further includes a timing corrector to correct a synchronization timing used for the PWM controller, and when the selector switches a system that controls operation of each of the sub modules from the first system to the second system, the timing corrector gradually shifts a synchronization timing used for the PWM controller toward a synchronization timing of a second synchronization command, based on a time difference between a synchronization timing of a first synchronization command included in the first control command and the synchronization timing of the second synchronization command included in the second control command.

16. The power conversion device according to claim 15, wherein
when the time difference is more than or equal to a reference threshold, the timing corrector shifts, by the reference threshold, the synchronization timing used for the PWM controller, toward the synchronization timing of the second synchronization command.

17. The power conversion device according to claim 16, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal, the plurality of leg circuits each include:
- a connecting part connected electrically to a corresponding phase of the AC circuit;
- an upper arm including first multiple sub modules among the plurality of sub modules, the first multiple sub modules being connected in series to each other between the connecting part and the high-potential-side DC terminal; and
- a lower arm including second multiple sub modules among the plurality of sub modules, the second multiple sub modules being connected in series to each other between the connecting part and the low-potential-side DC terminal, and the drive command includes an output voltage command value for the upper arm, and an output voltage command value for the lower arm.

18. The power conversion device according to claim 15, wherein the power conversion circuitry includes:
- a high-potential-side DC terminal and a low-potential-side DC terminal that are connected to the DC circuit; and
- a plurality of leg circuits corresponding to respective phases of the AC circuit and connected in parallel with each other between the high-potential-side DC terminal and the low-potential-side DC terminal, the plurality of leg circuits each include:
- a connecting part connected electrically to a corresponding phase of the AC circuit;
- an upper arm including first multiple sub modules among the plurality of sub modules, the first multiple sub modules being connected in series to each other between the connecting part and the high-potential-side DC terminal; and
- a lower arm including second multiple sub modules among the plurality of sub modules, the second multiple sub modules being connected in series to each other between the connecting part and the low-potential-side DC terminal, and the drive command includes an output voltage command value for the upper arm, and an output voltage command value for the lower arm.

19. The power conversion device according to claim 1, wherein the power conversion circuitry includes:
- a high-potential-side DC terminal and a low-potential-side DC terminal that are connected to the DC circuit; and
- a plurality of leg circuits corresponding to respective phases of the AC circuit and connected in parallel with each other between the high-potential-side DC terminal and the low-potential-side DC terminal;

the plurality of leg circuits each include:
- a connecting part connected electrically to a corresponding phase of the AC circuit;
- an upper arm including first multiple sub modules among the plurality of sub modules, the first multiple sub modules being connected in series to each other between the connecting part and the high-potential-side DC terminal; and
- a lower arm including second multiple sub modules among the plurality of sub modules, the second multiple sub modules being connected in series to each other between the connecting part and the low-potential-side DC terminal, and the drive command includes an output voltage command value for the upper arm, and an output voltage command value for the lower arm.

20. The power conversion device according to claim 1, wherein the first relay device and the second relay device are connected to each of the sub modules through a star-type network.

* * * * *